US012664266B2

(12) United States Patent (10) Patent No.: US 12,664,266 B2

Chen et al. (45) Date of Patent: Jun. 23, 2026

(54) REFRESH CONTROL METHOD, REFRESH CONTROL CIRCUIT AND MEMORY

(71) Applicant: CHANGXIN MEMORY TECHNOLOGIES, INC., Hefei City (CN)

(72) Inventors: Jixing Chen, Hefei City (CN); Lu Liu, Hefei City (CN); Zhonglai Liu, Hefei City (CN)

(73) Assignee: CHANGXIN MEMORY TECHNOLOGIES, INC., Hefei City (CN)

( * ) Notice: Subject to any disclaimer, the term of this patent is extended or adjusted under 35 U.S.C. 154(b) by 294 days.

(21) Appl. No.: 18/451,627

(22) Filed: Aug. 17, 2023

(65) Prior Publication Data

US 2024/0037230 A1    Feb. 1, 2024

Related U.S. Application Data

(63) Continuation of application No. PCT/CN2022/124014, filed on Oct. 9, 2022.

(30) Foreign Application Priority Data

Jul. 29, 2022    (CN) .......................... 202210908244.4

(51) Int. Cl.
G06F 21/55 (2013.01)

(52) U.S. Cl.
CPC ...... G06F 21/554 (2013.01); G06F 2221/034 (2013.01)

(58) Field of Classification Search
CPC .......................... G06F 21/554; G06F 2221/034
USPC ............................................................. 726/23
See application file for complete search history.

(56) References Cited

U.S. PATENT DOCUMENTS

| | | | |
|---|---|---|---|
| 9,269,418 B2 | 2/2016 | Felton | |
| 10,170,174 B1 | 1/2019 | Ito | |
| 10,490,252 B2 | 11/2019 | Ito | |
| 11,222,686 B1 * | 1/2022 | Noguchi | ........... G11C 11/40603 |
| 11,631,448 B1 * | 4/2023 | Lee | ................... G11C 11/40603 |
| | | | 711/106 |
| 2013/0205080 A1 | 8/2013 | Felton | |
| 2019/0139599 A1 | 5/2019 | Ito | |
| 2020/0294569 A1 | 9/2020 | Wu | |
| 2021/0335411 A1 | 10/2021 | Wu | |

FOREIGN PATENT DOCUMENTS

| | | | |
|---|---|---|---|
| CN | 111052243 A | 4/2020 | |
| CN | 112106138 A | 12/2020 | |
| CN | 114496018 A | 5/2022 | |
| KR | 20230068232 A | * 5/2023 | ....... G11C 11/40611 |

OTHER PUBLICATIONS

International Search Report in the international application No. PCT/CN2022/124014, mailed on Mar. 20, 2023. 6 pages with English translation.

* cited by examiner

*Primary Examiner* — Lan Dai T Truong

(74) *Attorney, Agent, or Firm* — Syncoda LLC; Feng Ma

(57) ABSTRACT

A refresh control method includes: generating a first random number; and preforming, in response to execution times of a regular refresh operation reaching the first random number after execution of a previous row hammer refresh operation, a new row hammer refresh operation.

16 Claims, 12 Drawing Sheets

S101

A first random number is generated

S102

In response to execution times of a regular refresh operation reaching the first random number after execution of a previous row hammer refresh operation, a new row hammer refresh operation is performed

REFRESH CONTROL METHOD, REFRESH CONTROL CIRCUIT AND MEMORY

CROSS-REFERENCE TO RELATED APPLICATIONS

This is a continuation of International Patent Application No. PCT/CN2022/124014 filed on Oct. 9, 2022, which claims priority to Chinese Patent Application No. 202210908244.4 filed on Jul. 29, 2022. The disclosures of the above-referenced applications are hereby incorporated by reference in their entirety.

BACKGROUND

Row hammer is a data attack against a dynamic random access memory, which results in data loss of adjacent word lines (hereinafter referred to as victim rows) by refreshing a certain word line (hereinafter referred to as an aggressor row) within a short time frequently. In order to reduce the risk of row hammer, a row hammer refresh operation may be performed during execution of a regular refresh operation, and an aggressor row for which the row hammer refresh operation is directed is randomly determined among the word lines on which an activation operation is performed. However, there are still some drawbacks when randomly determining the aggressor row, resulting in some defects in row hammer by using the mechanism.

SUMMARY

The present disclosure relates to the technical field of a semiconductor memory. The present disclosure provides a refresh control method, a refresh control circuit and a memory, which can improve randomness of row hammer refresh operations, thereby improving data security.

The technical solutions of the present disclosure are realized as follows.

According to a first aspect, embodiments of the present disclosure provide a refresh control method, which includes the following operations.

A first random number is generated.

In response to execution times of a regular refresh operation reaching the first random number after execution of a previous row hammer refresh operation, a new row hammer refresh operation is performed.

According to a second aspect, the embodiments of the present disclosure provide a refresh control circuit, which includes a first random number generation circuit and an interval control circuit.

The first random number generation circuit is configured to generate a first random number.

The interval control circuit is configured to receive the first random number and a refresh count signal, where the refresh count signal indicates execution times of a regular refresh operation after execution of a previous row hammer refresh operation; and output a row hammer refresh flag signal in response to the execution times of the regular refresh operation reaching the first random number.

The row hammer refresh flag signal instructs to perform a row hammer refresh operation.

In a third aspect, the embodiments of the present disclosure provide a memory. The memory at least includes the refresh control circuit according to the second aspect.

The embodiments of the disclosure provide a refresh control method, a refresh control circuit and a memory. The method includes the following operations. A first random number is generated; and in response to execution times of a regular refresh operation reaching the first random number after execution of a previous row hammer refresh operation, a new row hammer refresh operation is performed. In this way, a time interval between two adjacent row hammer refresh operations is randomly determined, thereby improving randomness of row hammer refresh operations, preventing attackers from performing row hammer attack on corresponding vulnerabilities, and improving the data security.

DETAILED DESCRIPTION

The technical solutions in the embodiments of the present disclosure will be clearly and completely described below in conjunction with the accompanying drawings in the embodiments of the present disclosure. It is to be understood that the specific embodiments described herein are merely intended to explain the relevant application and not to limit the application. It should also be noted that, for ease of description, only portions related to the related application are shown in the accompanying drawings. Unless otherwise defined, all technological and scientific terms used herein have meanings the same as those usually understood by those skilled in the art of the disclosure. Terms used in the disclosure are only adopted to describe the embodiments of the disclosure and not intended to limit the disclosure. "Some embodiments" involved in the following descriptions describes a subset of all possible embodiments. However, it is to be understood that "some embodiments" may be the same subset or different subsets of all the possible embodiments, and may be combined without conflicts. Term "first/second/third" involved in the embodiments of the present disclosure is only for distinguishing similar objects, and does not represent a specific sequence of the objects. It is to be understood that "first/second/third" may be interchanged to specific sequences or orders if allowed to implement the embodiments of the disclosure described herein in sequences except the illustrated or described ones.

Dynamic Random Access Memory (DRAM)

Synchronous Dynamic Random Access Memory (SDRAM)

Double Data Rate SDRAM (DDR)

Low Power DDR (LPDDR)

Figure 1:
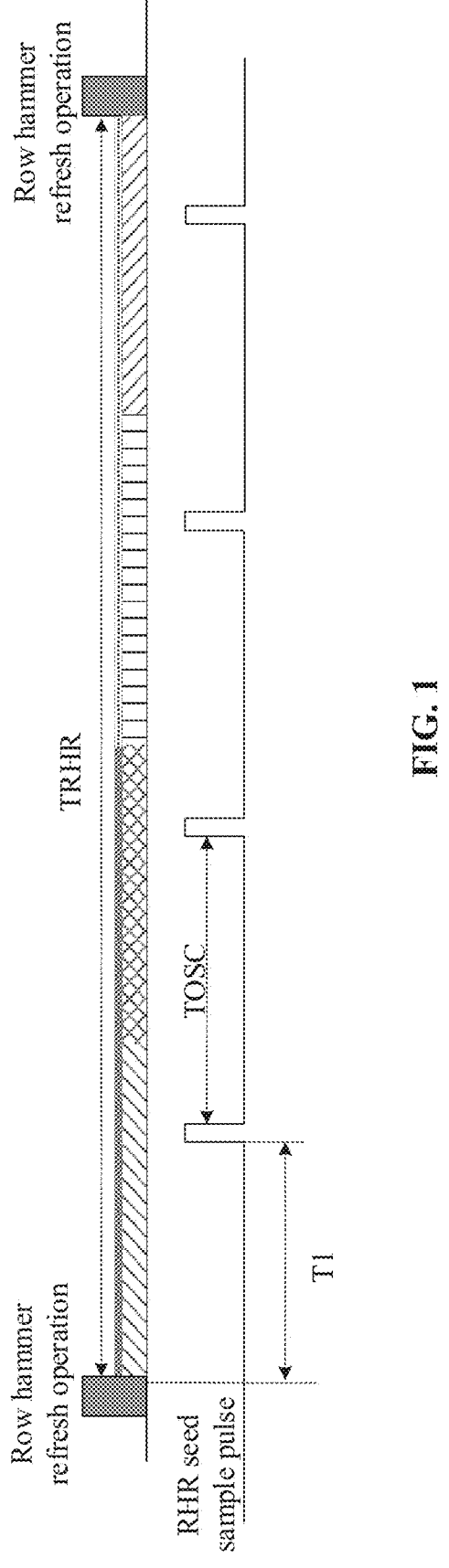
FIG. 1 is a schematic diagram of signal timing of a row hammer refresh operation.

At present, a row hammer refresh operation is introduced into normal refresh operations to reduce the impact of row hammer attacks on a memory. Specifically, when the row hammer refresh operation is performed, it is necessary to randomly select one of the word lines that have been activated recently as an aggressor row for the row hammer refresh operation, and adjacent word lines (also referred to as victim rows) of the aggressor row are refreshed. Referring to FIG. 1, a schematic diagram of signal timing of a row hammer refresh operation is illustrated. In FIG. 1, a time interval between two row hammer refresh RHR operations is TRHR, and a pulse period of a sample pulse signal RHR seed sample pulse is TOSC. As illustrated in FIG. 1, after a previous row hammer refresh RHR operation ends, an active address signal (the active address signal being used to indicate an activated word line) generated during the time interval between two row hammer refresh RHR operations is sampled using a pulse of the sample pulse signal RHR seed sample pulse, so as to obtain an address of the aggressor row based on the sampled address. This process is subsequently referred to as address sampling for short.

The address sampling may have randomness, specifically as follows: (1) a time after each row hammer refresh operation ends is set as a starting point of timing, a time T1 of a first pulse of the sample pulse signal RHR seed sample pulse is a random number, and T1 may be any value less than the pulse period TOSC. Further, because the pulse period of the sample pulse signal RHR seed sample pulse is fixed, occurrence times of other pulses of the sample pulse signal RHR seed sample pulse are also random numbers; (2) after the end of the previous row hammer refresh RHR operation and before the start of the current row hammer refresh RHR operation, a number of pulses in the sample pulse signal RHR seed sample pulse is a pseudo-random number; and when the sample pulse signal RHR seed sample pulse has multiple pulses, the last sampled address is taken as the aggressor row. However, as the time interval TRHR between two row hammer refresh RHR operations is fixed and the pulse period TOSC is also fixed, the randomness of the address sampling still has defects. The following is a detailed explanation.

It should be understood that in order to avoid row hammer, it is generally necessary to perform refresh operations on two adjacent rows (i.e., victim rows) around the aggressor row. That is, for the same aggressor row, two refresh operations are performed to refresh the two victim rows respectively, and these two refresh operations are respectively called as RHRa and RHRb. Specifically, a sample signal is masked during the duration from RHRa to RHRb, so that an active address accessed between RHRa and RHRb cannot be sampled, preventing the active address accessed between RHRa and RHRb from being used as the aggressor row.

Figure 2:
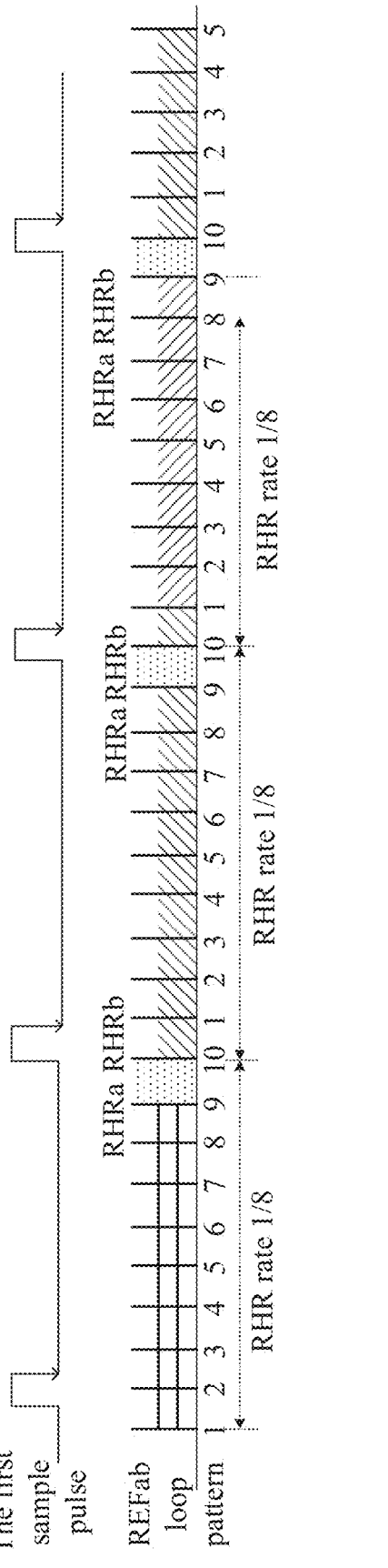
FIG. 2 is a schematic diagram of signal timing of another row hammer refresh operation.

Referring to FIG. 2, a schematic diagram of signal timing of another row hammer refresh operation is illustrated. In FIG. 2, taking a time after the end of each row hammer refresh operation as the starting point of timing, only a first pulse of the sample pulse signal is illustrated, which is called as the first sample pulse. In a refresh loop REFab loop pattern, each vertical line represents a refresh operation, vertical lines which are not identified as RHRa/RHRb are regular refresh operations, and vertical lines which are identified as RHRa/RHRb are row hammer refresh operations. Here, assuming that TRHT is exactly ⅛ of the refresh cycle (that is, the row hammer refresh operation is performed every 8 refresh operations), the active address signal between the 9th and 10th refresh operations in the refresh loop REFab loop pattern may never be sampled as the aggressor row since the active address signal is masked during the duration from RHRa to RHRb. In some extreme cases, some word lines may be activated mainly in a fixed period (between the 9th and 10th refresh operations). However, due to the masking effect in the address sampling process, it is impossible to perform row hammer refresh on these address signals, so attackers may attack against these address signals intensively, resulting in threats to the security of the memory.

Based on this, the embodiments of the present disclosure provide a refresh control method, which includes the following operations. A first random number is generated; and in response to execution times of a regular refresh operation reaching the first random number after execution of a previous row hammer refresh operation, a new row hammer refresh operation is performed. In this way, a time interval between two adjacent row hammer refresh operations is randomly determined, thereby improving randomness of row hammer refresh operations, preventing attackers from performing row hammer attack against corresponding vulnerabilities, and thus improve data security.

The embodiments of the present disclosure will be described in detail below with reference to the accompanying drawings.

Figure 3:
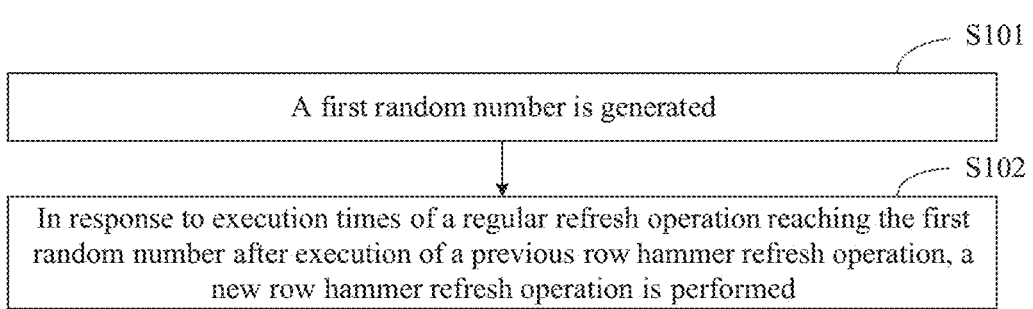
FIG. 3 is a schematic flowchart of a refresh control method according to an embodiment of the present disclosure.

In an embodiment of the present disclosure, referring to FIG. 3, FIG. 3 illustrates a schematic flowchart of a refresh control method according to the embodiment of the present disclosure. As illustrated in FIG. 3, the method includes the following operations.

In S101, a first random number is generated.

In S102, in response to execution times of a regular refresh operation reaching the first random number after execution of a previous row hammer refresh operation, a new row hammer refresh operation is performed.

It should be noted that the refresh control method according to the embodiment of the present disclosure is applied to a dynamic memory, such as DRAM, DDR, LPDDR or the like.

In the refresh control method according to the embodiment of the present disclosure, the number of regular refresh operations between two adjacent row hammer refresh operations is randomly determined, that is, the interval time TRHR between adjacent row hammer refresh operations is random, thereby increasing randomness of row hammer refresh operations during executions, preventing attackers from performing row hammer attack against corresponding vulnerabilities, and thus improving data security.

Figure 4:
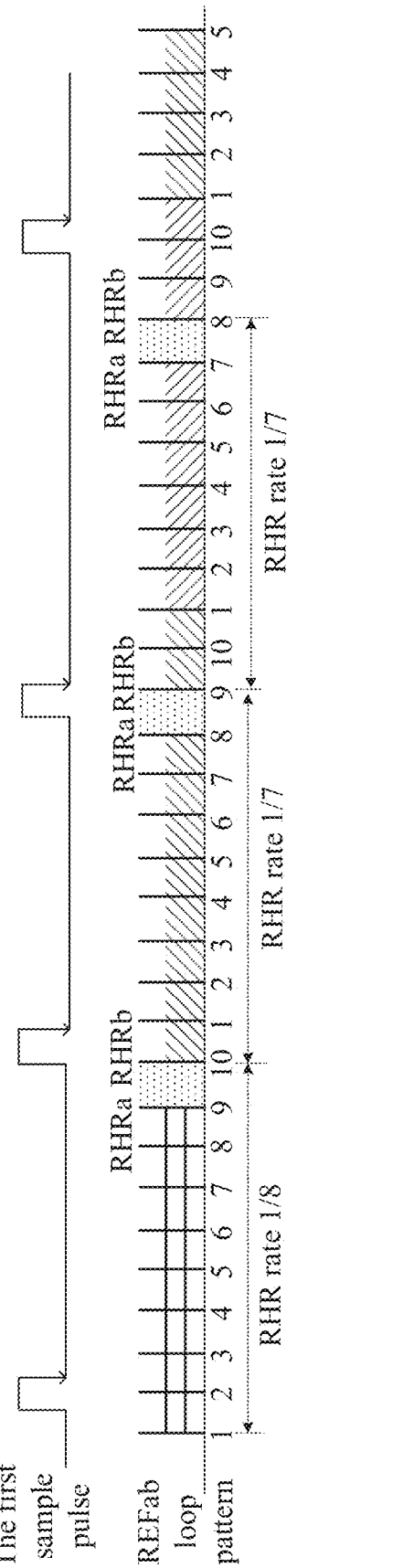
FIG. 4 is a schematic diagram of signal timing according to an embodiment of the present disclosure.

In some embodiments, referring to FIG. 2, one row hammer refresh operation corresponds to one aggressor row, and in such case, one row hammer refresh operation includes sub-operations for performing refresh on two victim rows of the aggressor row, that is, the row hammer refresh operation includes RHRa and RHRb. As illustrated in FIG. 2, in some implementations, the row hammer refresh operation is performed every 8 regular refresh operations between adjacent RHRb and RHRa. In an embodiment of the present disclosure, assuming that the first random numbers are 8, 7 and 7, respectively, referring to FIG. 4, FIG. 4 illustrates a schematic diagram of signal timing according to the embodiment of the present disclosure. As illustrated in FIG. 4, the first row hammer refresh operation and the second row hammer refresh operation are spaced by 8 regular refresh operations, the second row hammer refresh operation and the third row hammer refresh operation are spaced by 7 regular refresh operations, and the third row hammer refresh operation and the fourth row hammer refresh operation are spaced by 7 regular refresh operations. Comparing FIG. 2 with FIG. 4, it can be seen that in the embodiment of the present disclosure, an active address signal between the 9th and 10th refresh operations may still be sampled as the address of the aggressor row. That is, when the period of the sample signal is fixed, a period for masking the sample signal (that is, a period occupied by the row hammer refresh operation) is random, and there is no fixed period in which the active address signal is masked, which prevents attackers from performing attack against the vulnerability, and improve data security.

In some embodiments, the method also includes that the first random number is updated for each row hammer refresh operation. In this way, for each row hammer refresh operation, the values of the first random number may be different, thereby achieving the best randomness.

In other embodiments, the method also includes that the first random number is updated for a preset number of row hammer refresh operations. In this way, the first random number is randomly re-generated every preset number of row hammer refresh operations, thereby reducing power consumption. Here, the preset number may be 2, 4, 8, or the like.

Figure 5:
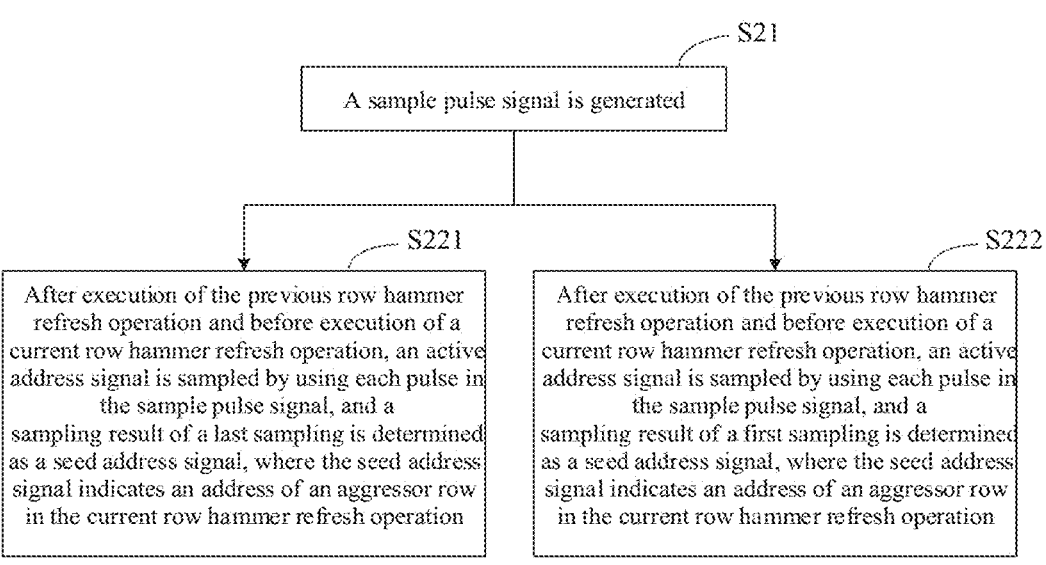
FIG. 5 is a schematic flowchart of another refresh control method according to an embodiment of the present disclosure.

In some embodiments, as illustrated in FIG. 5, the method also includes the following operations.

In S21, a sample pulse signal is generated.

In S221, after execution of a previous row hammer refresh operation and before execution of a current row hammer refresh operation, an active address signal is sampled by using each pulse in the sample pulse signal, and a sampling result of a last sampling is determined as a seed address signal. The seed address signal indicates an address of an aggressor row in the current row hammer refresh operation.

It should be noted that, as mentioned above, a length of the time period (i.e., TRHR) "after execution of the previous row hammer refresh operation and before execution of the current row hammer refresh operation" is determined according to the first random number and has randomness. Therefore, an occurrence time of a last pulse of the sample pulse signal in the time period also has randomness, so that the sampled active address signal (i.e., seed address signal) also has randomness, which prevents attackers from performing repeated attacks on corresponding vulnerabilities and improves data security.

In addition, in the time period "after execution of the previous row hammer refresh operation and before execution of the current row hammer refresh operation", an occurrence time of a first pulse of the sample pulse signal in the time period also has randomness. Thus, in other embodiments, as illustrated in FIG. 5, the method also includes the following operations.

In S21, a sample pulse signal is generated.

In S222, after execution of a previous row hammer refresh operation and before execution of a current row hammer refresh operation, an active address signal is sampled by using each pulse in the sample pulse signal, and a sampling result of a first sampling is determined as a seed address signal. The seed address signal indicates an address of an aggressor row in the current row hammer refresh operation.

In particular, in some other embodiments, for each row hammer refresh operation, the sampling result of the first sampling or the sampling result of the last sampling is determined as the seed address signal randomly, to further improve randomness of the address sampling.

Figure 6:
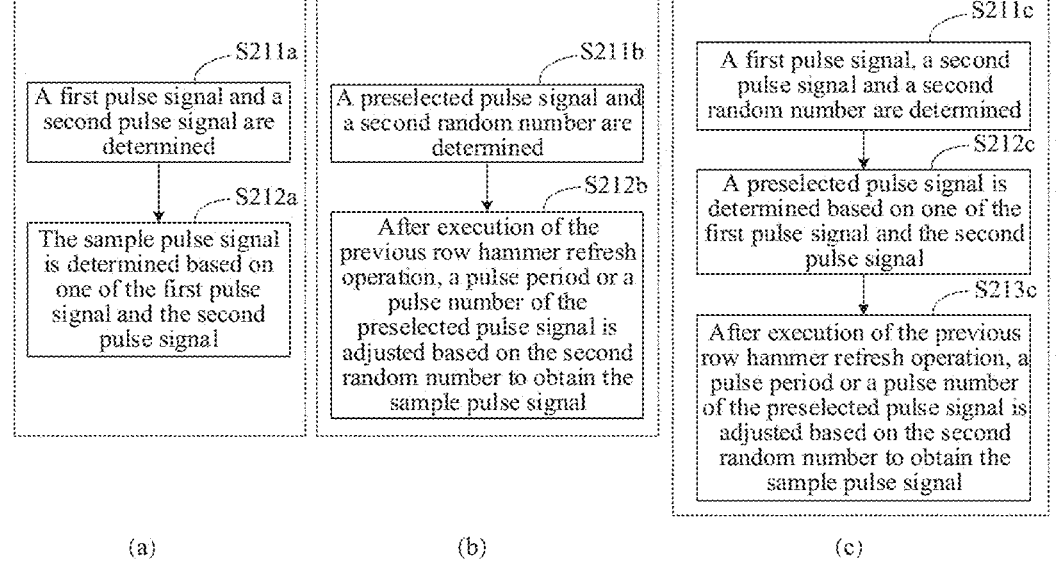
FIG. 6 is a schematic flowchart of another refresh control method according to an embodiment of the present disclosure.

In some embodiments, as illustrated in (a) of FIG. 6, the operation in S21 may include the following operations.

In S211a, a first pulse signal and a second pulse signal are determined.

In S212a, the sample pulse signal is determined based on one of the first pulse signal and the second pulse signal.

Here, the first pulse signal and the second pulse signal differ in at least one of: a pulse start time or a pulse period. In addition, for each row hammer refresh operation, the operation in S212a is re-performed. That is, for each row hammer refresh operation, it is necessary to randomly determine the sample pulse signal from the first pulse signal and the second pulse signal. In other embodiments, the first pulse signal or the second pulse signal may be selected only on power-up, i.e., before the first row hammer refresh operation, and is not adjusted thereafter. In yet another embodiment, it is to be understood that the pulses to be selected may be more than two pulse signals.

It should be noted that since the sample pulse signal may be randomly determined from two different pulse signals, the sample pulse signal has a certain randomness, which further increases randomness of the address sampling in the row hammer refresh operation.

Figure 7:
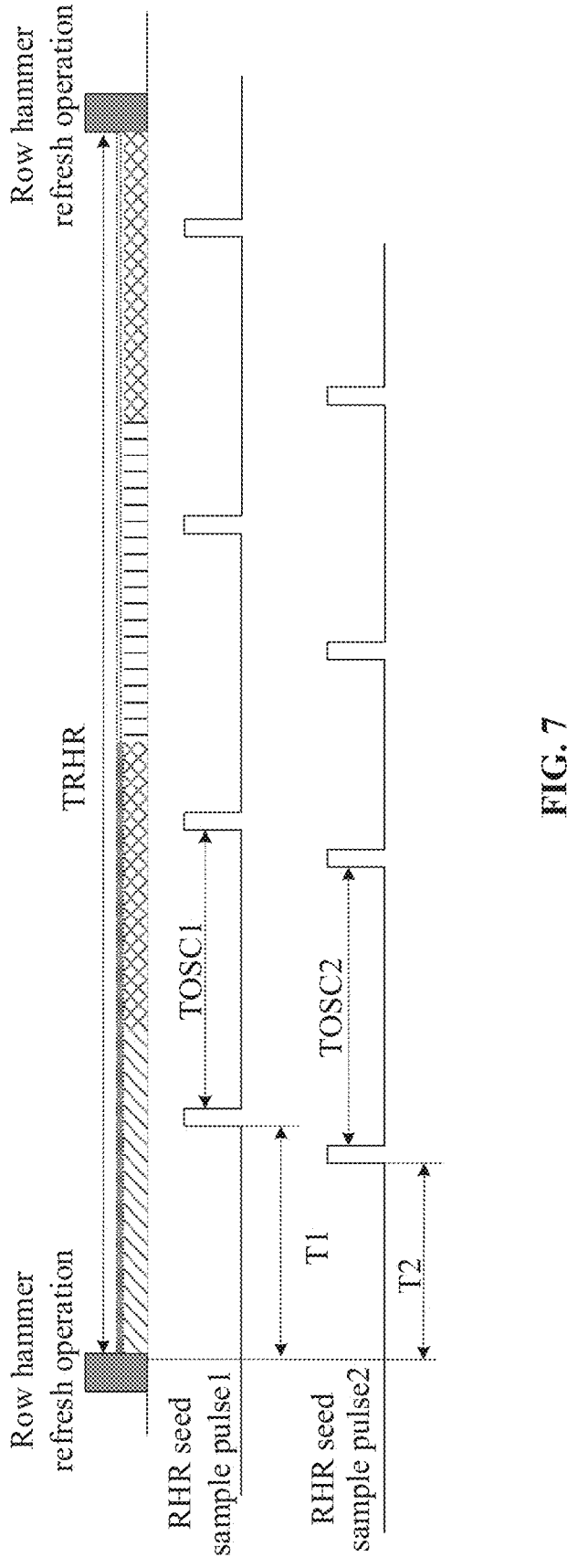
FIG. 7 is a schematic diagram of another signal timing according to an embodiment of the present disclosure.

In an example, referring to FIG. 7, FIG. 7 illustrates a schematic diagram of another signal timing according to an embodiment of the present disclosure. As illustrated in FIG. 7, the sample pulse signal is randomly determined from first pulse signal RHR seed sample pulse1 (a pulse period of which is TOSC1) and the second pulse signal RHR seed sample pulse2 (a pulse period of which is TOSC2). If the sample pulse signal is the first pulse signal RHR seed sample pulse1, an occurrence time of the first pulse is T1; and if the sample pulse signal is the second pulse signal RHR seed sample pulse2, an occurrence time of the first pulse is T2. That is, if the first sampled active address signal is taken as the seed address signal, the sampled active address signal will randomly correspond to time T1 or T2. Similarly, a similar effect may be achieved if pulse starting times of the first pulse signal RHR seed sample pulse1 and the second pulse signal RHR seed sample pulse2 are different.

In conjunction with FIG. 1 and FIG. 7, it can be seen that in the embodiments of the present disclosure, the time interval TRHR of the two row hammer refresh operations is random, and the period TOSC of the sample pulse signal is random, thereby improving randomness of the address sampling and data security.

In other embodiments, as illustrated in (b) of FIG. 6, the operation in S21 may include the following operations.

In S211b, a preselected pulse signal and a second random number are determined.

In S212$b$, after execution of the previous row hammer refresh operation, a pulse period or a pulse number of the preselected pulse signal is adjusted based on the second random number to obtain the sample pulse signal.

Here, for each row hammer refresh operation, the second random number is re-generated. Alternatively, the second random number is generated only once on power-up.

It should be noted that the second random number may indicate the pulse period of the preselected pulse signal, or the second random number may indicate the number of pulses of the preselected pulse signal.

Figure 8A:
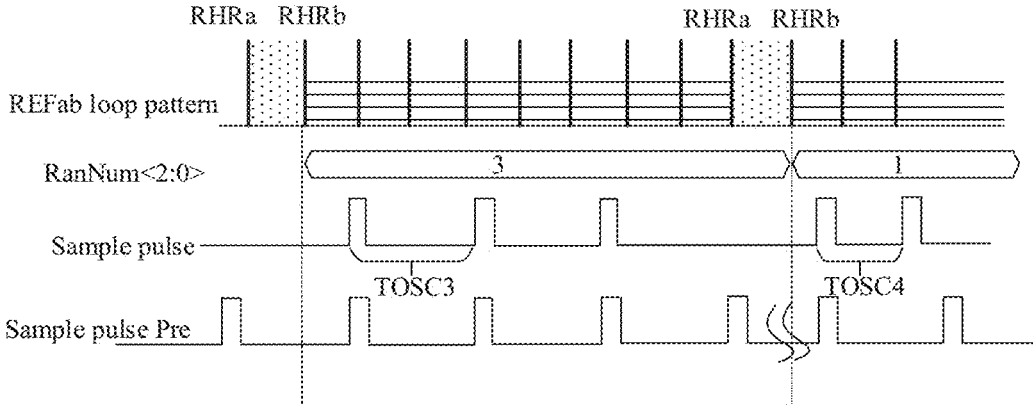
FIG. 8A is a schematic diagram of another signal timing according to an embodiment of the present disclosure.

Taking the second random number indicating the pulse period of the preselected pulse signal as an example, referring to FIG. 8A, FIG. 8A illustrates a schematic diagram of another signal timing according to an embodiment of the present disclosure. As illustrated in FIG. 8A, during the process of generating the sample pulse signal Sample pulse using the preselected pulse signal Sample pulse Pre, if the second random number RanNum2<2:0> is 3, the pulse period of the sample pulse signal Sample pulse is the corresponding value TOSC3; and if the second random number RanNum<2:0> is 1, the pulse period of the sample pulse signal Sample pulse is the corresponding value TOSC4. In FIG. 8A, the sample pulse signal Sample pulse may be one pulse less than the preselected pulse signal Sample pulse Pre because the missing sample pulse is masked during the row hammer refresh operation and is therefore not drawn, which does not mean that the pulse does not exist.

Figure 8B:
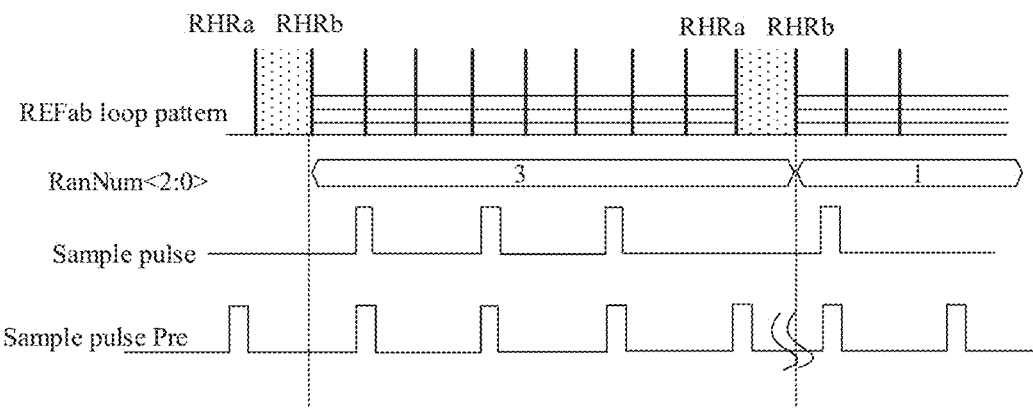
FIG. 8B is a schematic diagram of another signal timing according to an embodiment of the present disclosure.

Taking the second random number indicating the number of pulses of the preselected pulse signal as an example, referring to FIG. 8B, FIG. 8B illustrates a schematic diagram of another signal timing according to an embodiment of the present disclosure. As illustrated in FIG. 8B, during the process of generating the sample pulse signal Sample pulse using the preselected pulse signal Sample pulse Pre, if the second random number RanNum<2:0> is 3, the number of pulses of the Sample pulse is 3; and if the second random number RanNum<2:0> is 1, the number of pulses of the Sample pulse is 1, but the clock cycle of the preselected pulse signal Sample pulse Pre is always the same as that of the sample pulse signal Sample pulse.

It should be noted that the selected pulses obtained from the preselected pulse signal may be random, that is, the second random number of pulses may be randomly selected from the preselected pulse signal between adjacent row hammer refresh operations as pulses of the sample pulse signal within the row hammer refresh operation interval (i.e., the interval between adjacent row hammer refresh operations). In addition, a first second random number of pulses or a last second random number of pulses may be selected. Further, a maximum value of the second random number may be adjusted according to the row hammer refresh operation interval, that is, when the row hammer refresh operation interval obtained based on the first random number contains only m pulses of the preselected pulse signal, the maximum value of the second random number is m; or the second random number is an arbitrary value,. When the second random number is greater than the number of pulses of the preselected pulse signal within the row hammer refresh operation interval, all pulses of the preselected pulse signal are selected as pulses of the sample pulse signal; and when the second random number is less than the number of pulses of the preselected pulse signal within the row hammer refresh operation interval, the second random number of pulses are selected as pulses of the sample pulse signal.

In addition, when an active address sampled by the first sample pulse within the row hammer refresh operation interval is selected as the seed address, the last second random number of pulses may be selected as the pulses of the sample pulse signal, so that the time of the first sample pulse has greater randomness. Similarly, when an active address sampled by the last sample pulse within the row hammer refresh operation interval is selected as the seed address, the first second random number of pulses may be selected as the pulses of the sample pulse signal, so that the time of the last sample pulse has greater randomness.

That is, the preselected pulse signal has a fixed pulse period. For each row hammer refresh operation, the preselected pulse signal is adjusted according to the second random number obtained randomly, so that the sample pulse signal obtained has certain randomness. Accordingly, use of the sample pulse signal to sample the active address signal also has randomness, thereby improving the data security.

In some other embodiments, as illustrated in (c) of FIG. 6, the operation in S21 may include the following operations.

In S211$c$, a first pulse signal, a second pulse signal and a second random number are determined.

In S212$c$, a preselected pulse signal is determined based on one of the first pulse signal and the second pulse signal.

In S213$c$, after execution of the previous row hammer refresh operation, a pulse period or a pulse number of the preselected pulse signal is adjusted based on the second random number to obtain the sample pulse signal.

Here, for each row hammer refresh operation, the operation in S212$c$ is re-performed, and/or, the second random number is re-generated, so as to achieve the best random effect. In addition, the preselected pulse signal and the second random number may be re-determined for the preset number of row hammer refresh operations, thereby reducing power consumption.

In this way, the preselected pulse signal is determined from the first pulse signal and the second pulse signal, that is, the preselected pulse signal has certain randomness, and then the preselected pulse signal is adjusted in terms of the pulse period or the pulse number based on the second random number, thereby further increasing the randomness of the address sampling and improving the security of the memory.

The embodiments of the present disclosure provide a refresh control method, which mainly increases the randomness of row hammer refresh operations in the following two aspects: (1) controlling the time interval between two adjacent row hammer refresh operations to be random, that is, TRHR in FIG. 1 is random; (2) controlling the period and waveform of the sample pulse signal to be random, that is, TOSC and the first pulse/the last pulse in the sample pulse signal in FIG. 1 are random. This can prevent attackers from performing repeated attacks on corresponding vulnerabilities, and improve the data security.

Figure 9:
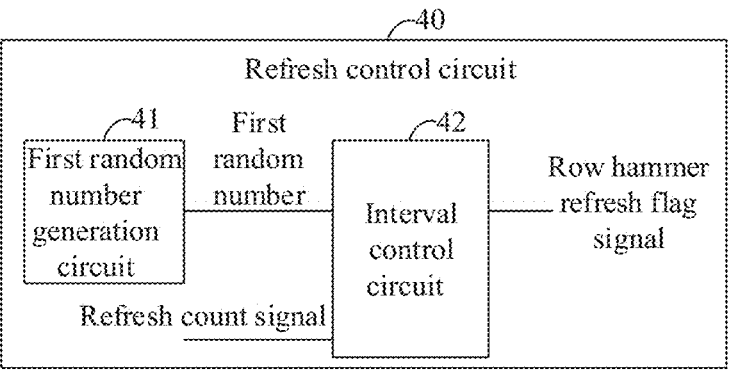
FIG. 9 is a schematic structural diagram of a refresh control circuit according to an embodiment of the present disclosure.

In another embodiment of the present disclosure, referring to FIG. 9, FIG. 9 illustrates a schematic structural diagram of a refresh control circuit 40 according to an embodiment of the present disclosure. As illustrated in FIG. 9, the refresh control circuit 40 includes a first random number generation circuit 41 and an interval control circuit 42.

The first random number generation circuit 41 is configured to generate a first random number.

The interval control circuit 42 is configured to receive the first random number and a refresh count signal, where the refresh count signal indicates execution times of a regular refresh operation after execution of a previous row hammer refresh operation; and output a row hammer refresh flag signal in response to the execution times of the regular refresh operation reaching the first random number. The row hammer refresh flag signal instructs to perform a row hammer refresh operation.

It should be noted that the refresh control circuit according to an embodiment of the present disclosure is applied to a dynamic memory, such as DRAM, DDR, LPDDR and so on, and can realize the refresh control method mentioned above.

Figure 10:
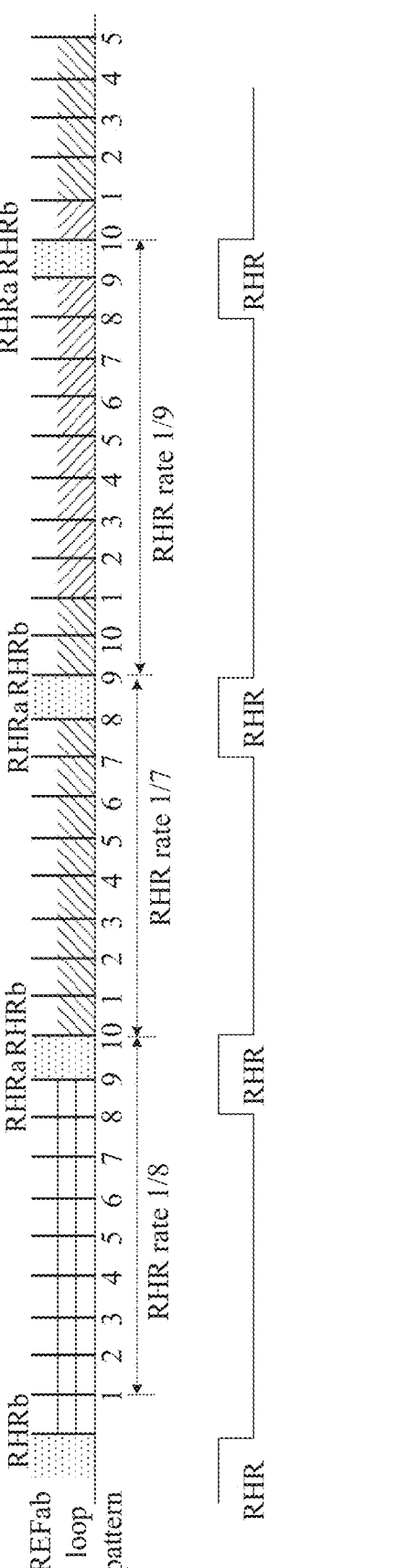
FIG. 10 is a schematic diagram of another signal timing according to an embodiment of the present disclosure.

Assuming that the first random numbers are 8, 7 and 9, respectively, referring to FIG. 10, FIG. 10 illustrates a schematic diagram of another signal timing according to an embodiment of the present disclosure. As illustrated in FIG. 10, the first row hammer refresh flag signal RHR and the second row hammer refresh flag signal RHR are spaced by 8 regular refresh operations, the second row hammer refresh flag signal RHR and the third row hammer refresh flag signal RHR are spaced by 7 regular refresh operations, and the third row hammer refresh flag signal RHR and the fourth row hammer refresh flag signal RHR are spaced by 9 regular refresh operations. That is, a period for masking the active address signal (that is, a period occupied by the row hammer refresh operation) is random, and there is no fixed period in which the active address signal is masked, thereby preventing attackers from performing attack on the vulnerability, and improving the data security.

Figures 11, 12:
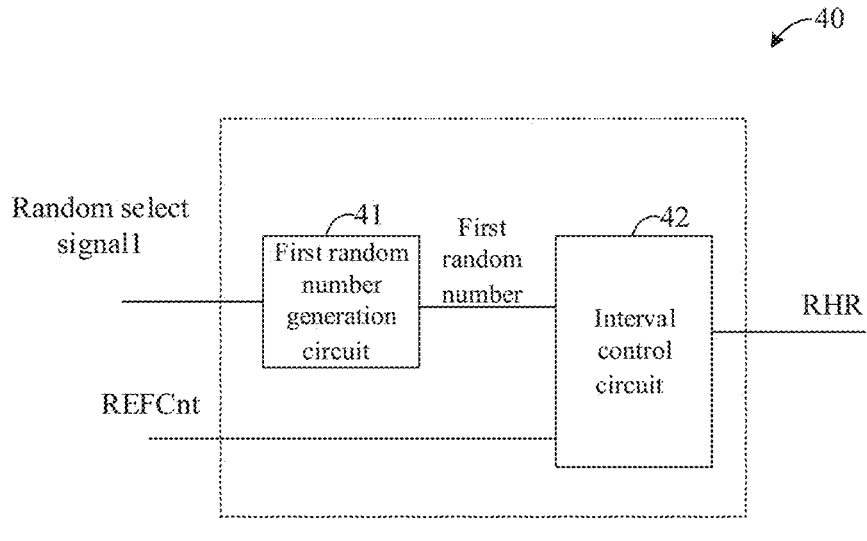
FIG. 11 is a detailed structural diagram of a refresh control circuit according to an embodiment of the present disclosure.
FIG. 12 is a first partial structural diagram of a refresh control circuit according to an embodiment of the present disclosure.

In some embodiments, as illustrated in FIG. 11, the first random number generation circuit 41 is specifically configured to receive a first random select signal Random select signal 1 and output the first random number based on the first random select signal Random select signal 1, where the first random select signal acts as an enabling function. Thereafter, the interval control circuit 42 is configured to output the row hammer refresh flag signal RHR based on the first random number and the refresh count signal REFCnt.

It should be noted that the first random number generation circuit 41 may be realized by means of a structure similar to a data selector, that is, the first random number generation circuit 41 has multiple input pins, multiple control pins and an output pin, and outputs a signal at the corresponding input pin according to the received control signal (i.e., the first random select signal Random select signal1) to obtain the first random number.

In addition, the first random selection signal Random select signal1 is updated based on the row hammer refresh flag signal RHR. In this way, each row hammer refresh operation is performed, the first random number is updated to achieve the best randomness. As mentioned above, the first random select signal Random select signal1 may also be updated based on the preset number of row hammer refresh flag signals RHRs, thereby reducing power consumption.

In some embodiments, referring to FIG. 12, FIG. 12 illustrates a first partial structural diagram of a refresh control circuit 40 according to an embodiment of the present disclosure. As illustrated in FIG. 12, the refresh control circuit 40 also includes a sampling control circuit 43 and an address sampling circuit 44.

The sampling control circuit 43 is configured to output a sample pulse signal Sample pulse.

The address sampling circuit 44 is configured to receive the sample pulse signal Sample pulse and an active address signal, perform sampling on the active address signal using each pulse of the sample pulse signal after execution of the previous row hammer refresh operation and before execution of a current row hammer refresh operation, and determine a sampling result of a last sampling as a seed address signal.

It should be noted that, as mention above, the address sampling circuit 44 may also be configured to determine a sampling result of a first sampling as the seed address signal. In an example, the address sampling circuit 44 is configured to randomly determine the sampling result of the first sampling or the sampling result of the last sampling as the seed address signal. In another example, the address sampling circuit 44 is configured to determine a sampling result with the highest repetition rate as the seed address signal.

Figure 13:
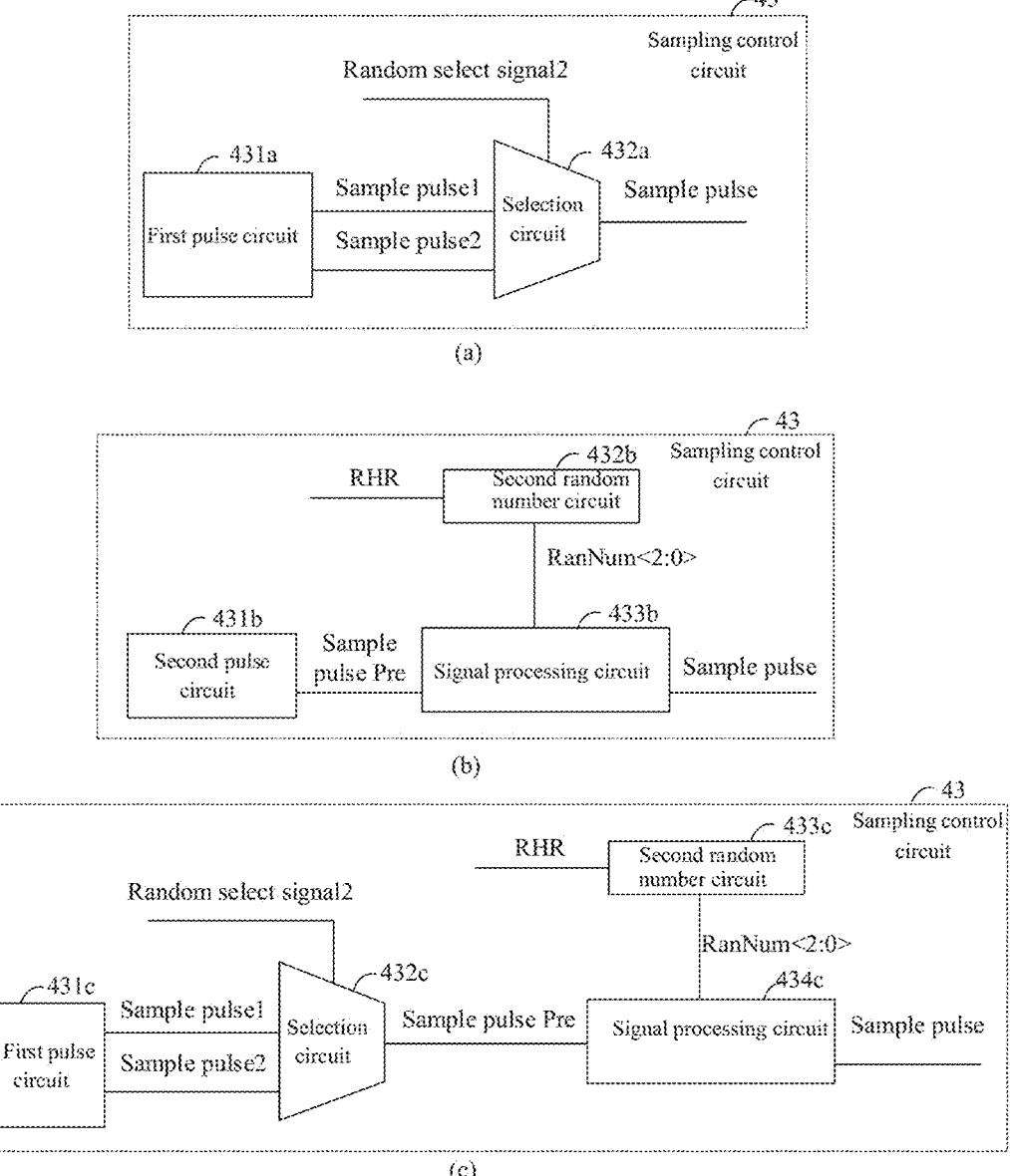
FIG. 13 is a second partial structure diagram of a refresh control circuit according to an embodiment of the present disclosure.

Referring to FIG. 13, FIG. 13 illustrates a second partial structure diagram of a refresh control circuit according to an embodiment of the present disclosure, specifically, a structural diagram of the sampling control circuit 43. In conjunction with FIG. 13, several possible structures of the sampling control circuit 43 are provided below.

In some embodiments, as illustrated in (a) of FIG. 13, the sampling control circuit 43 includes a first pulse circuit 431*a* and a selection circuit 432*a*.

The first pulse circuit 431*a* is configured to generate a first pulse signal Sample pulse1 and a second pulse signal Sample pulse2. The first pulse signal Sample pulse1 and the second pulse signal Sample pulse2 differ in at least one of: a pulse start time or a pulse period.

The selection circuit 432*a* is configured to receive the first pulse signal Sample pulse1 and the second pulse signal Sample pulse2, and determine the sample pulse signal based on one of the first pulse signal Sample pulse1 and the second pulse signal Sample pulse2.

Here, for each row hammer refresh operation, the selection circuit 432*a* is configured to randomly re-determine a preselected pulse signal Sample pulse Pre.

It should be noted that the first pulse circuit 431*a* may be formed by different pulse generators, so as to generate the first pulse signal Sample pulse1 and the second pulse signal Sample pulse2, respectively. In this way, since the sample pulse signal may be randomly determined from two pulse signals, the sample pulse signal has certain randomness, which further increases randomness of the address sampling in the row hammer refresh operation.

In other embodiments, as illustrated in (b) of FIG. 13, the sampling control circuit 43 includes a second pulse circuit 431*b*, a second random number circuit 432*b* and a signal processing circuit 433*b*.

The second pulse circuit 431*b* is configured to generate a preselected pulse signal Sample pulse Pre.

The second random number circuit 432*b* is configured to generate a second random number RanNum<2:0>, receive the row hammer refresh flag signal RHR, and update the second random number RanNum<2:0> based on the row hammer refresh flag signal RHR.

The signal processing circuit 433*b* is configured to receive the second random number RanNum<2:0> and the preselected pulse signal Sample pulse Pre, and adjust the preselected pulse signal Sample pulse Pre based on the second random number RanNum<2:0> to obtain the sample pulse signal Sample pulse.

It should be noted that the preselected pulse signal Sample pulse Pre has a fixed pulse period, and meanwhile, for each row hammer refresh operation, it is necessary to adjust the preselected pulse signal Sample pulse Pre according to the second random number RanNum<2:0> randomly obtained, so that the obtained sample pulse signal Sample pulse has certain randomness. Accordingly, use of the sample pulse signal Sample pulse to sample the active address signal also has randomness, which improves the security of the memory.

In some other embodiments, as illustrated in (c) of FIG. 13, the sampling control circuit 43 includes a first pulse circuit 431c, a selection circuit 432c, a second random number circuit 433c and a signal processing circuit 434c.

The first pulse circuit 431c is configured to generate a first pulse signal Sample pulse1 and a second pulse signal Sample pulse2. The first pulse signal Sample pulse1 and the second pulse signal Sample pulse2 differ in at least one of a pulse start time or a pulse period.

The selection circuit 432c is configured to receive the first pulse signal Sample pulse1 and the second pulse signal Sample pulse2, and determine a preselected pulse signal Sample pulse Pre based on one of the first pulse signal Sample pulse1 and the second pulse signal Sample pulse2.

The second random number circuit 433c is configured to generate a second random number RanNum<2:0>, receive the row hammer refresh flag signal RHR, and update the second random number RanNum<2:0> based on the row hammer refresh flag signal RHR.

The signal processing circuit 434c is configured to receive the second random number RanNum<2:0> and the preselected pulse signal Sample pulse Pre, and adjust the preselected pulse signal Sample pulse Pre based on the second random number RanNum<2:0> to obtain the sample pulse signal Sample pulse.

Here, for each row hammer refresh operation, the selection circuit 432c is configured to randomly re-determine the preselected pulse signal Sample pulse Pre.

Thus, the preselected pulse signal Sample pulse Pre is determined from the first pulse signal Sample pulse1 and the second pulse signal Sample pulse2, that is, the preselected pulse signal Sample pulse Pre has certain randomness, and then the preselected pulse signal Sample pulse Pre is adjusted in terms of the pulse period or the pulse number based on the second random number RanNum<2:0>, thereby further increasing the randomness of the address sampling and improving the security of the memory.

It should also be noted that, in the above description, the selection circuit (432a or 432c) may be realized using a dual data selector. That is, the selection circuit is specifically configured to receive the second random select signal Random select signal2, the first pulse signal Sample pulse1 and the second pulse signal Sample pulse2; output the first pulse signal Sample pulse1 in response to the second random select signal Random select signal2 being in a first state; or, output the second pulse signal Sample pulse2 in response to the second random select signal Random select signal2 being in a second state. The state of the second random selection signal Random select signal2 is updated based on the row hammer refresh flag signal RHR.

Here, the first state may be at a high level and the second state may be at a low level. Alternatively, the first state may be at a low level and the second state may be at a high level.

The embodiments of the present disclosure provide a refresh control method, which mainly increases the randomness of row hammer refresh operations in the following two aspects: (1) controlling the time interval between two adjacent row hammer refresh operations to be random, that is, TRHR in FIG. 1 is random; (2) controlling the period and waveform of the sample pulse signal to be random, that is, TOSC and the first pulse/the last pulse in the sample pulse signal are random. This can prevent attackers from performing repeated attacks on corresponding vulnerabilities, and improve the data security.

Figure 14:
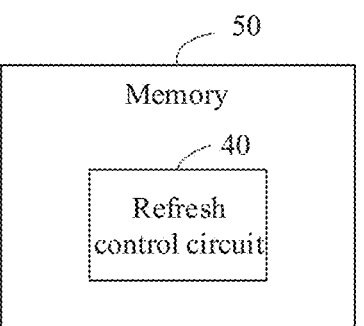
FIG. 14 is a schematic structural diagram of a memory according to an embodiment of the present disclosure.

In another embodiment of the present disclosure, referring to FIG. 14, FIG. 14 illustrates a schematic structural diagram of a memory 50 according to an embodiment of the present disclosure. As illustrated in FIG. 14, the memory 50 at least includes the refresh control circuit 40 mentioned above.

For the refresh control circuit 40 in the memory 50, the time interval between two adjacent row hammer refresh operations are randomly determined, thereby improving randomness of row hammer refresh operations, preventing attackers from performing row hammer attack on corresponding vulnerabilities, and improving the data security.

The above are merely the preferred embodiments of the present disclosure and are not intended to limit the scope of the present disclosure.

It should be noted that in the present disclosure, terms "include" and "contain" or any other variation thereof are intended to cover nonexclusive inclusions, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The sequence numbers of the embodiments of the disclosure are adopted not to represent superiority-inferiority of the embodiments but only for description.

The methods disclosed in some method embodiments provided in the disclosure may be freely combined without conflicts to obtain new method embodiments.

The features disclosed in some product embodiments provided in the disclosure may be freely combined without conflicts to obtain new product embodiments.

The features disclosed in some method or device embodiments provided in the disclosure may be freely combined without conflicts to obtain new method embodiments or device embodiments.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The embodiments of the disclosure provide a refresh control method, a refresh control circuit and a memory. The method includes the following operations. A first random number is generated; and in response to execution times of a regular refresh operation reaching the first random number after execution of a previous row hammer refresh operation, a new row hammer refresh operation is performed. In this way, a time interval between two adjacent row hammer refresh operations is randomly determined, thereby improving randomness of row hammer refresh operations, preventing attackers from performing row hammer attack on corresponding vulnerabilities, and improving the data security.

The invention claimed is:

1. A refresh control method, comprising: generating a first random number; and performing, in response to execution times of a regular refresh operation reaching the first random number after execution of a previous row hammer refresh operation, a new row hammer refresh operation.

2. The refresh control method of claim 1, further comprising:
    generating a sample pulse signal;

performing, after execution of the previous row hammer refresh operation and before execution of a current row hammer refresh operation, sampling on an active address signal using each pulse in the sample pulse signal, and determining a sampling result of a last sampling as a seed address signal, wherein the seed address signal indicates an address of an aggressor row in the current row hammer refresh operation.

3. The refresh control method of claim 2, wherein generating the sample pulse signal comprises:

determining a first pulse signal and a second pulse signal, wherein the first pulse signal and the second pulse signal differ in at least one of: a pulse start time or a pulse period; and determining the sample pulse signal based on one of the first pulse signal and the second pulse signal;

wherein for each row hammer refresh operation, determination of the sample pulse signal based on one of the first pulse signal and the second pulse signal is re-performed.

4. The refresh control method of claim 2, wherein generating the sample pulse signal comprises:

determining a preselected pulse signal and a second random number; and adjusting, after execution of the previous row hammer refresh operation, a pulse period or a pulse number of the preselected pulse signal based on the second random number to obtain the sample pulse signal;

wherein for each row hammer refresh operation, the second random number is re-generated.

5. The refresh control method of claim 2, wherein generating the sample pulse signal comprises:

determining a first pulse signal, a second pulse signal and a second random number;

determining a preselected pulse signal based on one of the first pulse signal and the second pulse signal, wherein the first pulse signal and the second pulse signal differ in at least one of: a pulse start time or a pulse period; and adjusting, after execution of the previous row hammer refresh operation, a pulse period or a pulse number of the preselected pulse signal based on the second random number to obtain the sample pulse signal;

wherein for each row hammer refresh operation, determination of the preselected pulse signal based on one of the first pulse signal and the second pulse signal is re-performed, and/or, the second random number is re-generated.

6. The refresh control method of claim 1, further comprising:

generating a sample pulse signal;

performing, after execution of the previous row hammer refresh operation and before execution of a current row hammer refresh operation, sampling on an active address signal using each pulse in the sample pulse signal, and determining a sampling result of a first sampling as a seed address signal, wherein the seed address signal indicates an address of an aggressor row in the current row hammer refresh operation.

7. The refresh control method of claim 1, further comprising:

updating the first random number for each row hammer refresh operation.

8. A refresh control circuit, comprising:

a first random number generation circuit, configured to generate a first random number; and an interval control circuit, configured to receive the first random number and a refresh count signal, the refresh count signal indicating execution times of a regular refresh operation after execution of a previous row hammer refresh operation; and output a row hammer refresh flag signal in response to the execution times of the regular refresh operation reaching the first random number;

wherein the row hammer refresh flag signal instructs to perform a row hammer refresh operation.

9. The refresh control circuit of claim 8, wherein the first random number generation circuit is configured to receive a first random select signal and output the first random number based on the first random select signal, wherein the first random select signal is updated based on the row hammer refresh flag signal.

10. The refresh control circuit of claim 8, further comprising:

a sampling control circuit, configured to output a sample pulse signal; and an address sampling circuit, configured to receive the sample pulse signal and an active address signal, perform, after execution of the previous row hammer refresh operation and before execution of a current row hammer refresh operation, sampling on the active address signal using each pulse of the sample pulse signal, and determine a sampling result of a last sampling as a seed address signal.

11. The refresh control circuit of claim 10, wherein the sampling control circuit comprises:

a first pulse circuit, configured to generate a first pulse signal and a second pulse signal, wherein the first pulse signal and the second pulse signal differ in at least one of: a pulse start time or a pulse period; and a selection circuit, configured to receive the first pulse signal and the second pulse signal, and determine the sample pulse signal based on one of the first pulse signal and the second pulse signal;

wherein for each row hammer refresh operation, the selection circuit is configured to re-determine a preselected pulse signal.

12. The refresh control circuit of claim 11, wherein the selection circuit is configured to receive a second random select signal, the first pulse signal and the second pulse signal; output the first pulse signal in response to the second random select signal being in a first state; or, output the second pulse signal in response to the second random select signal being in a second state;

wherein a state of the second random select signal is updated based on the row hammer refresh flag signal.

13. The refresh control circuit of claim 10, wherein the sampling control circuit comprises:

a second pulse circuit, configured to generate a preselected pulse signal;

a second random number circuit, configured to generate a second random number, receive the row hammer refresh flag signal, and update the second random number based on the row hammer refresh flag signal; and a signal processing circuit, configured to receive the row hammer refresh flag signal, the second random number and the preselected pulse signal, and adjust the preselected pulse signal based on the row hammer refresh flag signal and the second random number to obtain the sample pulse signal.

14. The refresh control circuit of claim 10, wherein the sampling control circuit comprises:

a first pulse circuit, configured to generate a first pulse signal and a second pulse signal, wherein the first pulse signal and the second pulse signal differ in at least one of: a pulse start time or a pulse period;

a selection circuit, configured to receive the first pulse signal and the second pulse signal, and determine a preselected pulse signal based on one of the first pulse signal and the second pulse signal;

a second random number circuit, configured to generate a second random number, receive the row hammer refresh flag signal, and update the second random number based on the row hammer refresh flag signal; and a signal processing circuit, configured to receive the row hammer refresh flag signal, the second random number and the preselected pulse signal, and adjust the preselected pulse signal based on the row hammer refresh flag signal and the second random number to obtain the sample pulse signal;

wherein for each row hammer refresh operation, the selection circuit is configured to re-determine the preselected pulse signal.

15. The refresh control circuit of claim 14, wherein the selection circuit is configured to receive a second random select signal, the first pulse signal and the second pulse signal; output the first pulse signal in response to the second random select signal being in a first state; or, output the second pulse signal in response to the second random select signal being in a second state;

wherein a state of the second random select signal is updated based on the row hammer refresh flag signal.

16. A memory, comprising a refresh control circuit, comprising:

a first random number generation circuit, configured to generate a first random number; and an interval control circuit, configured to receive the first random number and a refresh count signal, the refresh count signal indicating execution times of a regular refresh operation after execution of a previous row hammer refresh operation; and output a row hammer refresh flag signal in response to the execution times of the regular refresh operation reaching the first random number;

wherein the row hammer refresh flag signal instructs to perform a row hammer refresh operation.

* * * * *